(12) United States Patent
Kim et al.

(10) Patent No.: US 9,320,055 B2
(45) Date of Patent: Apr. 19, 2016

(54) METHOD FOR EFFICIENTLY TRANSMITTING BROADCASTING MESSAGE IN BROADBAND WIRELESS ACCESS SYSTEM

(75) Inventors: Jeong Ki Kim, Anyang-si (KR); Hee Jeong Cho, Anyang-si (KR); Ki Seon Ryu, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 996 days.

(21) Appl. No.: 13/384,061

(22) PCT Filed: Jul. 19, 2010

(86) PCT No.: PCT/KR2010/004707
§ 371 (c)(1),
(2), (4) Date: Jan. 13, 2012

(87) PCT Pub. No.: WO2011/008061
PCT Pub. Date: Jan. 20, 2011

(65) Prior Publication Data
US 2012/0113947 A1  May 10, 2012

Related U.S. Application Data

(60) Provisional application No. 61/226,297, filed on Jul. 17, 2009, provisional application No. 61/235,350, filed on Aug. 19, 2009, provisional application No. 61/238,137, filed on Aug. 28, 2009.

(30) Foreign Application Priority Data

Jul. 19, 2010   (KR) .......................... 10-2010-006370

(51) Int. Cl.
*H04W 72/00*  (2009.01)
*H04W 72/12*  (2009.01)

(52) U.S. Cl.
CPC ........ *H04W 72/1289* (2013.01); *H04W 72/005* (2013.01)

(58) Field of Classification Search
CPC ........................ H04W 72/005; H04W 72/1289
USPC ......... 370/229–231, 235, 236, 310, 351, 389, 370/390, 392, 431, 432, 912
See application file for complete search history.

(56) References Cited

U.S. PATENT DOCUMENTS

2007/0286127 A1* 12/2007  Inohiza ......................... 370/331
2008/0273454 A1* 11/2008  Malkamaki et al. .......... 370/216

(Continued)

FOREIGN PATENT DOCUMENTS

KR  10-2007-0117812     12/2007
KR  10-2008-0000206     1/2008

(Continued)

*Primary Examiner* — Khaled Kassim
(74) *Attorney, Agent, or Firm* — Dentons US LLP

(57) ABSTRACT

The present invention relates to a broadband wireless access system, and more particularly to a method for efficiently communicating scheduling information about a broadcasting message to a terminal. The method for transmitting the broadcasting message in the broadband wireless access system comprises the steps of: transmitting a first map including scheduling information for at least one broadcasting message transmitted within a predetermined transmission unit to a terminal; and broadcasting the message through a resource region indicated by the scheduling information. In the method, it is desirable that the first map is an extended map of a second map including non-user specific control information.

6 Claims, 7 Drawing Sheets

(56) References Cited

U.S. PATENT DOCUMENTS

2008/0310391 A1* 12/2008 Schneidman et al. ........ 370/349
2009/0274071 A1* 11/2009 Ramesh et al. ............... 370/277
2009/0316806 A1* 12/2009 Cheng et al. .................. 375/260
2011/0007683 A1* 1/2011 Kim et al. ..................... 370/312
2011/0134825 A1* 6/2011 Kim et al. ..................... 370/312
2011/0255499 A1* 10/2011 Kim et al. ..................... 370/329
2012/0113940 A1* 5/2012 Cho et al. ...................... 370/329

FOREIGN PATENT DOCUMENTS

KR   10-2008-0058693   6/2008
KR   10-2010-0133874   12/2010

* cited by examiner

* A-A-MAP : Assignment Advanced MAP
* BM-A-A-MAP : Broadcast Message A-A-MAP

* A-A-MAP : Assignment Advanced MAP
* BM-A-A-MAP : Broadcast Message A-A-MAP

\* A-A-MAP : Assignment Advanced MAP
\* NUS A-MAP : Non-user specific A MAP
\* Extended NUS A-MAP

METHOD FOR EFFICIENTLY TRANSMITTING BROADCASTING MESSAGE IN BROADBAND WIRELESS ACCESS SYSTEM

This application is a National Stage Application, in accordance with 35 U.S.C. §371, of International Patent Application No. PCT/KR-2010/004707, filed Jul. 19, 2010, which is incorporated herein by reference in its entirety. This application also claims the benefit of priority of U.S. Provisional Application No. 61/226,297 filed on Jul. 17, 2009; U.S. Provisional Application No. 61/235,350 filed on Aug. 19, 2009; U.S. Provisional Application No. 61/238,137 filed on Aug. 28, 2009; and Korean Patent Application No. 10-2010-0069370 filed on Jul. 19, 2010, all of which are incorporated by reference in their entirety herein.

TECHNICAL FIELD

The present invention relates to a broadband wireless access system, and more particularly, to a method for efficiently informing a mobile station of scheduling information of a broadcast message.

BACKGROUND ART

In a mobile communication system, each Base Station (BS) in one cell/sector exchanges data with a plurality of Mobile Stations (MSs) through a radio channel environment. In a system operating in multiple carriers or in a form similar thereto, a BS receives packet traffic from a wired Internet network and transmits the received packet traffic to each MS using a predetermined communication scheme. In this case, determination to which MS at which timing and in which frequency domain the BS transmits downlink (DL) data is DL scheduling. The BS receives and demodulates data transmitted from the MS using the determined communication scheme and transmits the packet traffic to the wired Internet network. Determination to which MS at which timing and in which frequency domain the BS transmits uplink (UL) data is UL scheduling. Generally, an MS having a better channel state is scheduled to transmit and receive data using substantial time and more frequency resources.

FIG. 1 is a diagram explaining a time-frequency resource block.

A resource for communication in a system operating in multiple carriers or in a form similar thereto is broadly divided into a time domain and a frequency domain. This resource may be defined as a resource block which includes N certain subcarriers, and M certain subframes or a determined time unit. Here, N and M may be 1. In FIG. 1, one rectangular denotes one resource block. One resource block includes multiple subcarriers in one axis and a predetermined time unit in another axis. In DL, the BS selects the MS according to a predetermined scheduling rule and allocates one or more resource blocks to the selected MS. The BS transmits data to the selected MS using the allocated resource block. In UL, the BS selects the MS and allocates one or more blocks to the selected MS according to a determined scheduling rule. The MS receives scheduling information indicating that the resource blocks have been allocated from the BS and transmits UL data using the allocated resource.

In a DL scheduling scheme, the BS selects a time-frequency resource block having a better channel state based on a Channel Quality Indicator (CQI) reported from the MS and transmits data using the selected resource block. Since the time-frequency resource block having a better channel state is used, much data can be transmitted while using a limited resource block and total data transmission capacity of the system can be increased. Similarly, in a UL scheduling scheme, a BS scheduler may measure the reception state of a pilot signal (or reference signal) transmitted from the MS to select a time-frequency resource block having a better UL channel state and allocates the selected resource block to the MS. The MS then transmits data in UL using the allocated resource.

Service control information consists of User-Specific Control Information (USCI) and Non-User-Specific Control Information (NUSCI). The NUSCI includes information for the MS to decode the USCI, such as the size of the USCI.

The USCI includes control information for users and includes resource allocation information, power control information, feedback (Hybrid Automatic Repeat reQuest (HARQ) or Acknowledgement/Negative Acknowledgement (ACK/NACK)) information. The feedback (HARQ or ACK/NACK) information about UL data transmission is transmitted through a DL ACK channel and is distinguished from a control block for other USCI.

Group control information may be used to allocate and configure a resource to one or more MSs belonging to one group. The control information may have the format of an A-MAP. For the USCI intended for a group of users, multiple control information elements are individually coded and are masked before transmission to a Cyclic Redundancy Check (CRC) of the A-MAP using an identifier (ID) of the MS (including Station ID (STID) of an individual MS, broadcast STID, and multicast STID). Since the A-MAP is individually encoded and masked to the STID before transmission, the MS performs a blind detection process of an A-MAP transmission region in order to confirm whether an A-MAP is transmitted thereto. In this case, the MS uses an STID, broadcast ID, or multicast ID (e.g. group ID, persistent ID, sleep/idle mode ID, MBS ID, etc.) allocated thereto.

The MS performs blind detection based on a MAP size used in a corresponding system. To reduce the number of times of performing blind detection, the MAP size may be restricted to a prescribed size and a type of the MAP size may be limited. For example, the size of an A-MAP Information Element (IE) may be restricted to three types of 56 (or 64), 96, and 144 or two types of 56 (or 64) and 96. It is assumed that, when one Minimum Logic Resource Unit (MLRU) consists of 48 data subcarriers and two MLRUs consist of 96 data subcarriers, the size of the A-MAP IE is determined as 56 and 96. In this case, the 56-bit A-MAP IE may be mapped to one MLRU and a 96-bit A-MAP IE may be mapped to two MLRUs, using an encoding method (Tail Biting Convolution Code (TBCC) and puncturing) for a DL control channel.

Generally, a Medium Access Control (MAC) management message for a certain MS may be transmitted to a corresponding MS through a DL burst indicated by an assignment A-MAP of a non-user-specific region. However, since a broadcast message such as a neighbor advertisement (AAI_NBR-ADV) message or a paging advertisement (AAI_PAG-ADV) message is dedicated for multiple non-specific MSs, it is necessary to inform the MS of scheduling information using a method different from a general unicast MAC management message. Accordingly, a definition for a scheduling information transmission method for efficient broadcast messaging is needed.

DETAILED DESCRIPTION OF THE INVENTION

Technical Problems

The present invention is devised to solve the above-described problem of the general art and an object of the present invention is to provide a MAP region structure for efficiently transmitting scheduling information of a broadcast message to an MS.

It will be appreciated by persons skilled in the art that that the effects that can be achieved through the present invention are not limited to what has been particularly described hereinabove and other advantages of the present invention will be more clearly understood from the following detailed description.

Technical Solutions

To solve the above problem, a method for transmitting a broadcast message in a broadband wireless access system according to an embodiment of the present invention includes transmitting a first MAP including scheduling information for at least one broadcast message transmitted within a prescribed transmission unit to a mobile station; and broadcasting the at least one broadcast message through a resource region indicated by the scheduling information, wherein the first MAP is an extended MAP of a second MAP including non-user specific control information.

The first MAP may be transmitted immediately after the second MAP when an extension flag of the second MAP is set.

The scheduling information may include type information indicating the type of the at least one transmitted broadcast message and allocation size information indicating the resource region.

The type information may have a format of a bitmap which classifies a plurality of broadcast messages into at least one group according to a mode of the mobile station and includes a bit indicating whether broadcast messages included in each classified group have been transmitted.

To solve the above problem, a method for receiving a broadcast message from a base station at a mobile station in a broadband wireless access system according to an embodiment of the present invention includes receiving a first MAP including scheduling information for at least one broadcast message transmitted from the base station within a prescribed transmission unit; and receiving the at least one broadcast message from the base station through a resource region indicated by the scheduling information, wherein the first MAP is an extended MAP of a second MAP including non-user specific control information.

The first MAP may be transmitted from the base station immediately after the second MAP when an extension flag of the second MAP is set.

The scheduling information may include type information indicating the type of the at least one transmitted broadcast message and allocation size information indicating the resource region.

The type information may have a format of a bitmap which classifies a plurality of broadcast messages into at least one group according to a mode of the mobile station and includes a bit indicating whether broadcast messages included in each classified group have been transmitted.

The reception of the at least one broadcast message may be performed only when a bit corresponding to the mode of the mobile station is set in the bitmap.

To solve the above problem, a mobile station for receiving a broadcast message from a base station in a broadband wireless access system according to an embodiment of the present invention includes a processor; and a radio frequency module for transmitting and receiving a radio signal to and from the base station according to control of the processor, wherein the processor performs a control function to receive a first MAP transmitted from the base station within a prescribed transmission unit, thereby obtaining scheduling information for at least one broadcast message and to receive the at least one broadcast message from the base station through a resource region indicated by the scheduling information, and wherein the first MAP is an extended MAP of a second MAP including non-user specific control information.

The first MAP may be transmitted from the base station immediately after the second MAP when an extension flag of the second MAP is set.

The scheduling information may include type information indicating the type of the at least one transmitted broadcast message and allocation size information indicating the resource region.

The type information may have a format of a bitmap which classifies a plurality of broadcast messages into at least one group according to a mode of the mobile station and includes a bit indicating whether broadcast messages included in each classified group have been transmitted.

The processor may perform a control function to receive the at least one broadcast message only when a bit corresponding to the mode of the mobile station is set in the bitmap.

In the above-described embodiments, the first MAP may be an extended non-user specific A-MAP, the second MAP may be a non-user specific A-MAP, and the prescribed transmission unit may be a subframe.

Advantageous Effects

An MS can efficiently obtain scheduling information of a broadcast message transmitted through at least one of a user-specific region and a non-user-specific region in a MAP region.

While the MS obtains scheduling information of a broadcast message, a decoding error is decreased. Since a MAP IE for one broadcast message is used, a BS can save a radio resource caused by attachment of CRC.

It will be appreciated by persons skilled in the art that that the effects that can be achieved through the present invention are not limited to what has been particularly described hereinabove and other advantages of the present invention will be more clearly understood from the following detailed description.

BEST MODE FOR CARRYING OUT THE INVENTION

Figure 1:
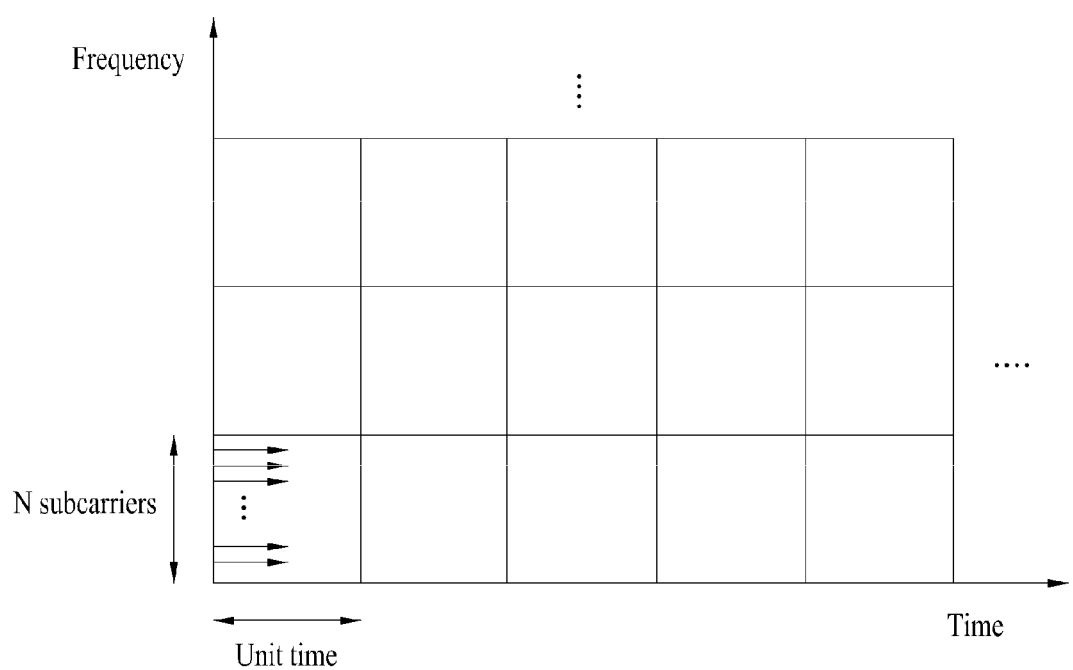
FIG. 1 is a diagram explaining a time-frequency resource block.

The following embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a base station and a mobile station. Here, the base station refers to a terminal node of a network communicating directly with the mobile station. In some cases, a specific operation described as being performed by the base station may be performed by an upper node of the base station.

Namely, it is apparent that, in a network comprised of a plurality of network nodes including a base station, various operations performed for communication with a mobile station may be performed by the base station, or network nodes other than the base station. The term 'base station' may be replaced with the terms 'fixed station', 'Node B', 'eNode B' (eNB), 'access point', 'Advanced Base Station' (ABS), etc. The term 'mobile station' may be replaced with the terms 'terminal', 'User Equipment' (UE), 'Mobile Subscriber Station' (MSS), etc.

The embodiments according to the present invention can be implemented by various means, for example, hardware, firmware, software, or combinations thereof.

In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is positioned at the interior or exterior of the processor and may transmit data to and receive data from the processor via various known means.

The embodiments of the present invention can be supported by standard documents disclosed in at least one of wireless access systems, i.e., IEEE 802, 3GPP, 3GPP LTE, and 3GPP2. Namely, among the embodiments of the present invention, steps or parts which are not described to clarify the technical features of the present invention can be supported by the above standard documents. Also, all terms disclosed herein can be described by the above standard documents.

Particularly, the embodiments of the present invention can be supported by one or more of standard documents of IEEE 802.16, i.e., P802.16e-2004, P802.16e-2005, P802.16Rev2, and IEEE P802.16m.

The specific terms used in the embodiments of the present invention are provided to aid in understanding of the present invention and those terms may be changed without departing from the spirit of the present invention.

First Embodiment

In an IEEE 802.16m system, an A-MAP region is divided into a Non-User-Specific (NUS) A-MAP region and a user-specific A-MAP region.

As described above, information necessary for decoding user-specific A-MAPs of the user-specific A-MAP region is included in the NUS A-MAP region. The user-specific A-MAP includes a HARQ Feedback A-MAP (HF-A-MAP), a Power Control A-MAP (PC-A-MAP), and an assignment A-MAP. The present invention proposes that an A-MAP including scheduling information of a broadcast message be included in the user-specific A-MAP. In this specification, such an A-MAP including the scheduling information of the broadcast message will be referred to as "broadcast A-MAP" or "assignment broadcast A-MAP" for convenience.

In the general IEEE 802.16m system, the broadcast A-MAP may be positioned immediately after the NUS A-MAP region. The number of broadcast A-MAPs may be indicated through assignment A-MAP size information or information representing an assignment broadcast A-MAP group in the NUS A-MAP region. If the number of assignment broadcast A-MAP is indicated through the assignment broadcast A-MAP group, the assignment broadcast A-MAP may take the form of a broadcast A-MAP IE. One broadcast A-MAP IE includes scheduling information about one broadcast message. The scheduling information about the broadcast message may include a type field indicating the type of the broadcast message and a length field indicating the length of the broadcast message.

Broadcast messages about which scheduling information is transmitted by the broadcast A-MAP IEs are positioned after the A-MAP region and before a downlink (DL) burst. The respective broadcast messages may be arranged in order of the broadcast A-MAP IEs positioned in the A-MAP region.

Such a form is described with reference to FIG. 2.

Figure 2:
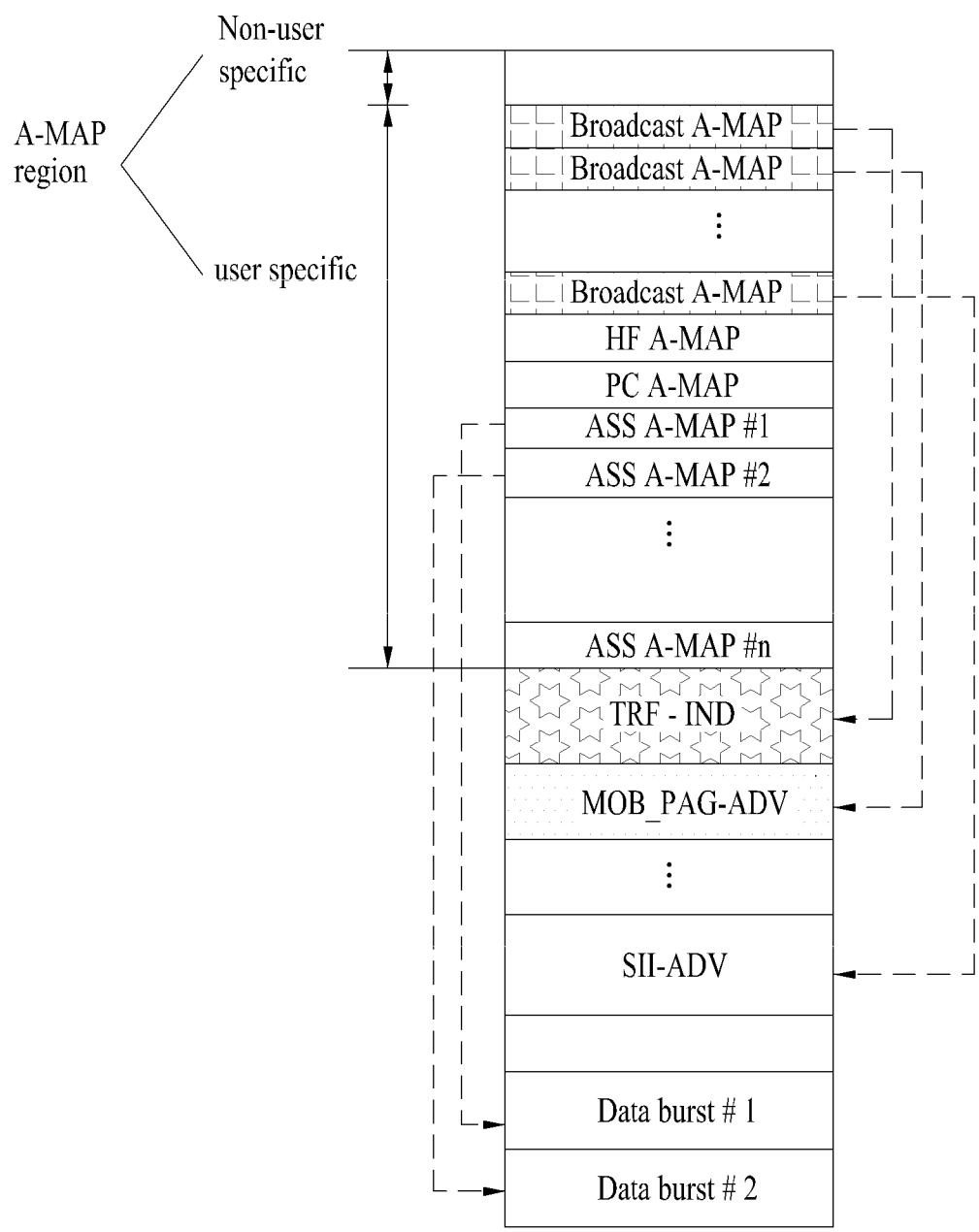
FIG. 2 shows an example of the structure of an A-MAP region in a general IEEE 802.16m system.

FIG. 2 shows an example of the structure of an A-MAP region in a general IEEE 802.16m system.

It is assumed in FIG. 2 that the largest rectangle denotes one DL subframe. Referring to FIG. 2, a NUS region is positioned at the top of a resource region and broadcast A-MAP IEs of a number indicated in the NUS region are positioned after the NUS region. The respective broadcast A-MAP IEs sequentially indicate broadcast messages following the A-MAP region.

However, since the broadcast A-MAP IE generally does not include a CRC bit, if any one of a plurality of broadcast A-MAP IEs generates a decoding error as in the NUS region, an MS may wrongly calculate the locations of the next broadcast A-MAP IEs. Then, decoding overhead may occur when the MS decodes broadcast messages indicated by the corresponding broadcast A-MAP IEs.

To solve such a problem, one embodiment of the present invention proposes that one broadcast A-MAP be present in one A-MAP region.

The broadcast A-MAP IE according to the present embodiment may include scheduling information of one or more broadcast messages. The broadcast A-MAP IE is desirably positioned at the front of an assignment A-MAP in an A-MAP region. That is, a MAP in which NUSCI is transmitted, an HF A-MAP, and a PC A-MAP are sequentially located and the broadcast A-MAP IE may be positioned after the PC A-MAP.

Broadcast messages scheduled by the broadcast A-MAP IE are sequentially positioned after the A-MAP region.

The NUSCI includes the assignment size of the broadcast A-MAP IE, (# of LRUs or # of MLRUs). If the assignment size of the broadcast A-MAP IE of the NUSCI is 0, the broadcast A-MAP IE is not present in the A-MAP region and resources through which the broadcast messages are transmitted after the A-MAP region are not assigned. On the contrary, if the assignment size of the broadcast A-MAP IE of the NUSCI is 1 or more, the broadcast A-MAP IE is present in the A-MAP region and the broadcast messages are transmitted in a resource region indicated by the broadcast A-MAP IE after the A-MAP region. A transmission order of the broadcast messages conforms to an order indicated by the broadcast A-MAP IE.

The structure of the above-described A-MAP according to an embodiment of the present invention is described with reference to FIG. 3.

Figure 3:
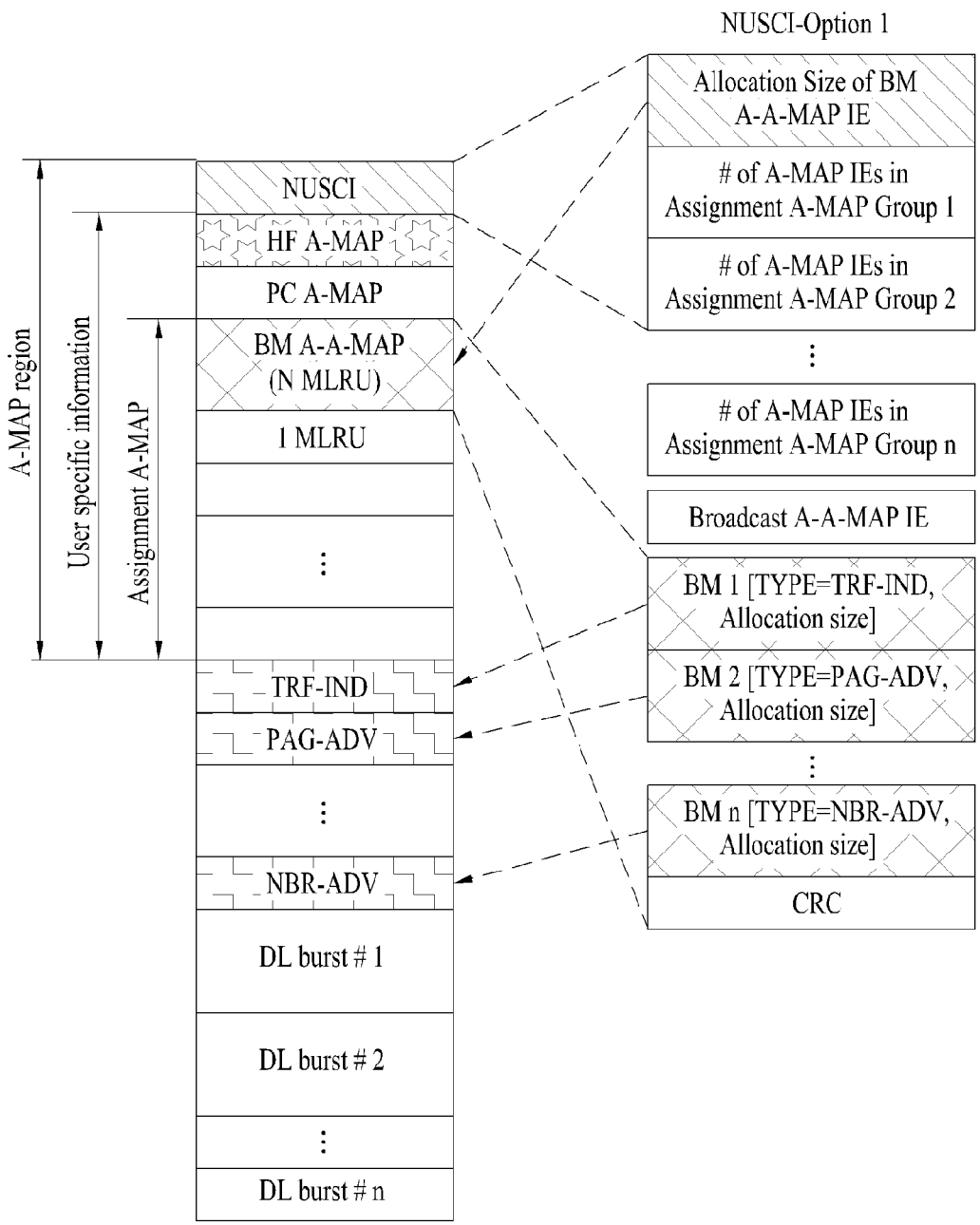
FIG. 3 shows an example of the structure of an A-MAP of a DL subframe and the arrangement of broadcast messages corresponding to the A-MAP structure when one broadcast A-MAP is used, according to one embodiment of the present invention.

FIG. 3 shows an example of the structure of an A-MAP of a DL subframe and the arrangement of broadcast messages corresponding to the A-MAP structure when one broadcast A-MAP is used, according to one embodiment of the present invention.

Referring to FIG. 3, the size of a resource assigned to a broadcast A-MAP IE is indicated through NUSCI. One broadcast assignment A-MAP IE may be positioned after an HF A-MAP and a PC A-MAP in a user-specific A-MAP region. The broadcast assignment A-MAP IE includes type information and allocation size information of each broadcast message transmitted in a corresponding downlink subframe. A CRC bit may be attached to the end of the broadcast assignment A-MAP IE. Respective broadcast messages, scheduling information of which is indicated by the broadcast assignment A-MAP IE, may be positioned after the A-MAP region according to an order indicated by the broadcast assignment A-MAP IE.

Hereinafter, the structures of the NUSCI and the broadcast assignment A-MAP IE for the present embodiment will be described with reference to Table 1 to Table 3.

Table 1 shows a part of the structure of the NUSCI according to one embodiment of the present invention.

TABLE 1

| Index | Assignment Broadcast A-MAP group (AB A-MAP group) | Assignment A-MAP group-1 | Assignment A-MAP group-2 | ... |
|---|---|---|---|---|
| ... | The number of LRUs (or MLRUs) of a Broadcast A-MAP IE | ... | ... | ... |

Referring to Table 1, the size of a resource assigned to the broadcast assignment A-MAP IE may be indicated through a field of the number of LRUs (or MLRUs) of a Broadcast A-MAP IE in the NUSCI.

Table 2 shows an example of the structure of the broadcast assignment A-MAP IE according to one embodiment of the present invention.

TABLE 2

| Syntax | Size (bit) | Notes |
|---|---|---|
| Broadcast A-A-MAP IE format ( ) { | — | — |
| Num | TBD [2] | The number of the broadcast messages scheduled by this IE (0b00:1~0b11:4) |
| For (i=0; i<=Num; i++) { | | |
| Message Type | 4 | This indicates the type of broadcast management message 0b0000: AAI_TRF-IND message 0b0001: AAI_PAG-ADV message 0b0010~0b1111: Reserved |
| Allocation Size | 8 | This indicates the number of LRUs allocated for broadcast management message. |
| } | | |
| Padding | Variable | |
| CRC | 16 | |
| } | | |

Referring to Table 2, the broadcast assignment A-MAP IE includes a Num field indicating the total number of broadcast messages scheduled in a corresponding subframe and includes scheduling information of broadcast messages corresponding to a number indicated in the Num field. The scheduling information of the broadcast message includes message type information and allocation size information.

The Num field may be replaced by a Flag field in function. This is described with reference to Table 3.

Table 3 shows another example of the structure of the broadcast assignment A-MAP IE according to one embodiment of the present invention.

TABLE 3

| Syntax | Size (bit) | Notes |
|---|---|---|
| Broadcast A-MAP IE format ( ) { | — | — |
| For (i=0; i==0; i=flag) { | | |
| Message Type | 4 | This indicates the type of broadcast management message 0b0000: AAI_TRF-IND message 0b0001: AAI_PAG-ADV message 0b0010~0b1111: Reserved |
| Allocation Size | 8 | This indicates the number of LRUs allocated for broadcast management message. |
| Flag | 1 | If there is another scheduled broadcast message, this field is set to 0. Otherwise, this field is set to 1. |
| } | | |
| Padding | Variable | |
| CRC | 16 | |
| } | | |

Referring to Table 3, a Flag field is added instead of the Num field of Table 2, whereas the other fields are similar to those of Table 2. The Flag field may be positioned after scheduling information (i.e. message type and allocation size information) for one broadcast message. If the Flag field is set to 1, this indicates that there is scheduling information of another broadcast message after scheduling information of a corresponding broadcast message. If the Flag field is set to 0, this indicates that a corresponding broadcast message is the last broadcast message indicated in the broadcast assignment A-MAP IE.

1-1

Meanwhile, according to another aspect of the present embodiment, information about the number of broadcast messages scheduled in the broadcast A-MAP IE may be included in a NUSCI A-MAP region. In this case, the assumption is the same as the above-described embodiment except for the NUSCI.

Since a BS does not directly inform an MS of information about the number of resources allocated to the broadcast assignment A-MAP IE, the MS can implicitly judge the size of the broadcast A-MAP IE using the information of the number of broadcast messages indicated in the NUSCI.

The structure of an A-MAP according to the above-described embodiment is described with reference to FIG. 4.

Figure 4:
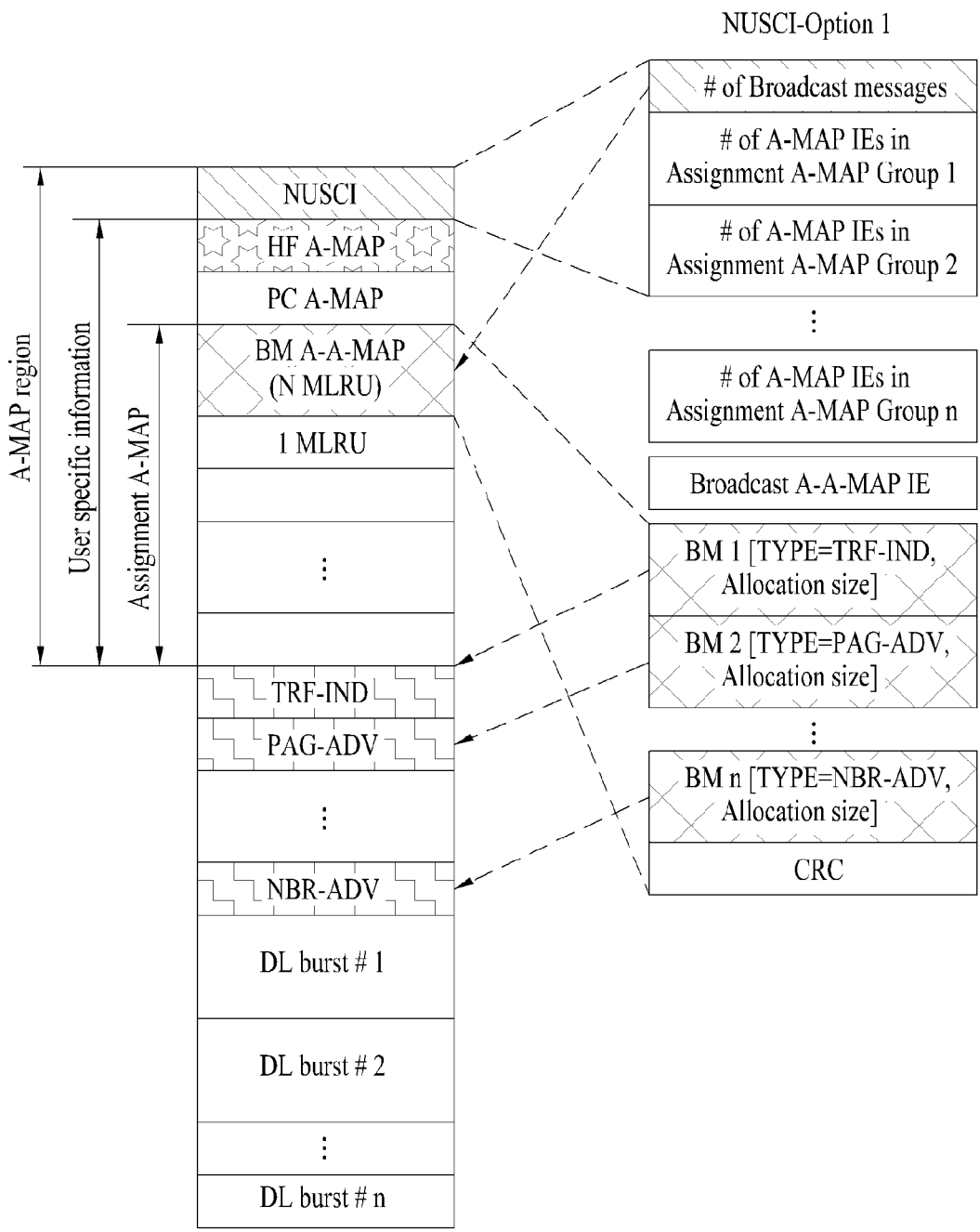
FIG. 4 shows an example of an A-MAP structure of a DL subframe and a broadcast message arrangement corresponding to the A-MAP structure when one broadcast A-MAP is used, according to another aspect of one embodiment of the present invention.

FIG. 4 shows an example of the structure of an A-MAP of a DL subframe and the arrangement of broadcast messages corresponding to the A-MAP structure when one broadcast A-MAP is used, according to another aspect of one embodiment of the present invention.

Referring to FIG. 4, the number of broadcast messages, scheduling information of which is transmitted by a broadcast A-MAP IE, is indicated through NUSCI. One broadcast assignment A-MAP IE may be positioned after an HF A-MAP and a PC A-MAP in a user-specific A-MAP region. The broadcast assignment A-MAP IE includes type information and allocation size information of each broadcast message transmitted in a corresponding downlink subframe. A CRC bit may be attached to the end of the broadcast assignment A-MAP IE. Respective broadcast messages, scheduling information of which is indicated by the broadcast assignment A-MAP IE, may be transmitted after the A-MAP region according to an order indicated by the broadcast assignment A-MAP IE.

Hereinafter, the structures of the NUSCI and the broadcast assignment A-MAP IE for the present embodiment will be described with reference to Table 1 to Table 3.

Table 4 shows a part of the structure of the NUSCI according to another aspect of one embodiment of the present invention.

TABLE 4

| Index | Broadcast Assignment A-MAP group (BA A-MAP group) | Assignment A-MAP group-1 | Assignment A-MAP group-2 | ... |
|---|---|---|---|---|
| ... | The number of broadcast messages scheduled by Broadcast A-MAP IE | ... | ... | ... |

Referring to Table 4, the number of broadcast messages scheduled by the broadcast A-MAP IE may be indicated through a field of 'The number of broadcast messages scheduled by Broadcast A-MAP IE' in the NUSCI.

TABLE 5

| Syntax | Size (bit) | Notes |
|---|---|---|
| Broadcast A-A-MAP IE format ( ) { | — | — |
| For (the number of broadcast messages) { | | |
| Message Type | 4 | This indicates the type of broadcast management message |

TABLE 5-continued

| Syntax | Size (bit) | Notes |
|---|---|---|
| Allocation Size | 8 | 0b0000: AAI_TRF-IND message 0b0001: AAI_PAG-ADV message 0b0010~0b1111: Reserved This indicates the number of LRUs allocated for broadcast management message. |
| } | | |
| Padding | Variable | |
| CRC | 16 | |
| } | | |

Referring to Table 5, since the number of broadcast messages scheduled by the broadcast assignment A-MAP IE is indicated in the NUSCI, a field related to the number of broadcast messages is excluded from the broadcast assignment A-MAP IE unlike Table 2 or Table 3.

1-2

Meanwhile, still another aspect of the present embodiment proposes that one broadcast A-MAP IE be included in one subframe and the size of the broadcast A-MAP IE be fixed.

More specifically, if one or more broadcast messages (e.g. ABI, TRF-IND, PAG_ADV, etc.) are transmitted in a corresponding subframe, one broadcast A-MAP IE of a fixed size (e.g. 56 bits) may be present in one A-MAP region. Scheduling information of one or more broadcast messages is included in one broadcast A-MAP IE.

The broadcast A-MAP IE may be positioned at the front of an assignment A-MAP. That is, the broadcast A-MAP IE may be positioned after NUSCI, an HF A-MAP, and a PC A-MAP. Alternatively, the broadcast A-MAP IE may be positioned immediately after the NUSCI.

If one broadcast A-MAP IE of a fixed size is used, the NUSCI may include an Indicator field indicating whether the broadcast A-MAP IE is included in a corresponding subframe. That is, the Indicator field indicates whether a broadcast message is present in a corresponding subframe. Specifically, if the Indicator field is set to 0, this indicates that the broadcast A-MAP IE is absent in the corresponding subframe and that the broadcast message is not transmitted in the corresponding subframe. On the contrary, if the Indicator field is set to 1, this indicates that the broadcast A-MAP IE is present in the corresponding subframe and that one or more broadcast messages are transmitted in the corresponding subframe.

Respective broadcast messages scheduled by the broadcast A-MAP IE may be transmitted after the A-Map region in an order indicated in the broadcast A-MAP IE.

Information included in the broadcast A-MAP IE may include type information of the scheduled broadcast message and allocation size information. A description of each information element is as follows.

1) Type Information

Type information may use a method for mapping a broadcast message of each type to a predetermined index. In this case, type indexes corresponding in number to broadcast messages transmitted in a corresponding subframe are included in the broadcast A-MAP IE.

A method may be used in which each bit in a bitmap is previously assigned to different broadcast messages and a broadcast message corresponding to a bit set to 1 is transmitted. For example, when the first bit of a type bitmap is assigned to a paging message, if the first bit of the type bitmap is set to 1, this may indicate that the paging message is transmitted in a corresponding subframe.

Size information of allocation resource

Size information of each broadcast message may be indicated. In this case, the size information of an allocation resource corresponding in number to broadcast messages is included in the broadcast A-MAP IE.

All messages may be indicated as one resource allocation size. In this case, the size information of an allocation resource is one and indicates the size of a resource allocated to all broadcast messages transmitted in a corresponding subframe.

Hereinafter, a detailed structure of the broadcast A-MAP IE according to a combination of the above-described type information and size information of an allocation resource will be described.

First, Table 6 shows an example of the structure of the broadcast A-MAP IE according to still another aspect of one embodiment of the present invention.

TABLE 6

| Syntax | Size (bit) | Notes |
|---|---|---|
| Broadcast A-MAP IE format ( ) { | | |
| Num | TBD [2 or 3] | The number of the broadcast messages scheduled by this IE. The maximum number is 4 or 8. E.g. if the length of Num is 3, then (0b00:1~0b11:8). |
| For (i=0; i<=Num; i++) { | | |
| Message Type | TBD[4] | This indicates the type of broadcast management message. The length of message type is Ceil {log2(the total number of broadcast messages)}. For example, if the total number of broadcast messages is 14, then the length of Message Type is 4. 0b0000: AAI_TRF-IND message 0b0001: AAI_PAG-ADV message 0b0010~0b1111: Reserved |
| Allocation Size | 8 | This indicates the total number of LRUs allocated for broadcast management messages. |
| } | | |
| Padding | Variable | |
| CRC | 16 | |
| } | | |

Referring to Table 6, the broadcast assignment A-MAP IE includes a Num field indicating the total number of broadcast messages scheduled in a corresponding subframe and includes scheduling information of broadcast messages corresponding to a number indicated in the Num field. The scheduling information of the broadcast message includes message type information and allocation size information. In this case, the Message Type field indicates an index assigned to each broadcast message with respect to a broadcast message scheduled in a corresponding subframe. In addition, the Allocation size field indicates the size of a resource allocated to each individual broadcast message.

Next, Table 7 shows another example of the structure of the broadcast A-MAP IE according to still another aspect of one embodiment of the present invention.

TABLE 7

| Syntax | Size (bit) | Notes |
|---|---|---|
| Broadcast A-MAP IE format ( ) { | | |
| Num | TBD [2 or 3] | The number of the broadcast messages scheduled by this IE. The maximum number is 4 or 8. E.g.) if the length of Num is 3, then (0b00:1~0b11:8). |
| For (i=0; i<=Num; i++) { | | |
| Message Type | TBD[4] | This indicates the type of broadcast management message. The length of message type is Ceil {log2(the total number of broadcast messages)}. For example, if the total number of broadcast messages is 14, then the length of Message Type is 4. 0b0000: AAI_TRF-IND message 0b0001: AAI_PAG-ADV message 0b0010~0b1111: Reserved |
| } | | |
| Allocation Size | 8 | This indicates the total number of LRUs allocated for broadcast management messages transmitted at this subframe. |
| Padding | Variable | |
| CRC | 16 | |
| } | | |

The structure of the broadcast A-MAP IE of Table 7 is similar to that of Table 6. However, the allocation size information is individually indicated with respect to each broadcast message in Table 6, whereas Table 7 shows the size of a resource allocated to all broadcast messages transmitted in a corresponding subframe.

Table 8 shows still another example of the structure of the broadcast A-MAP IE according to still another aspect of one embodiment of the present invention.

TABLE 8

| Syntax | Size (bit) | Notes |
|---|---|---|
| Broadcast A-MAP IE format ( ) { | | |
| For (i=0; i<=N; i++) { | | N: The maximum number of broadcast messages which can be indicated in this A-MAP IE. e.g.) If the length of the allocation size is 8 bits and the length of the message type is 4 bits, then N shall be 8. |
| Message Type | TBD[4] | This indicates the type of broadcast management message. 0b0000: AAI_TRF-IND message 0b0001: AAI_PAG-ADV message 0b0010~0b1111: Reserved |
| } | | |
| Allocation Size | TBS[8] | This indicates the total number of LRUs allocated for broadcast management messages transmitted at this subframe. |

TABLE 8-continued

| Syntax | Size (bit) | Notes |
|---|---|---|
| Padding | Variable | |
| CRC | 16 | |
| } | | |

In this embodiment, since the size of the broadcast A-MAP IE is predetermined, if the type of scheduling information of a broadcast message is determined, the maximum number of broadcast messages which can be included in the broadcast A-MAP IE may be predetermined. Accordingly, the Num field may be omitted in Table 8 unlike Table 7.

Next, Table 9 shows another example of the structure of the broadcast A-MAP IE according to still another aspect of one embodiment of the present invention

TABLE 9

| Syntax | Size (bit) | Notes |
|---|---|---|
| Broadcast A-MAP IE format ( ) { | | |
| Type Bitmap | TBD[8] [16] | Bitmap indicating the types of broadcast messages. For each bit 1: indicate that the corresponding broadcast message is transmitted at this subframe (or TTI) |
| Allocation Size | 8 | This indicates the total number of LRUs allocated for broadcast management messages transmitted at this subframe. |
| Padding | Variable | |
| CRC | 16 | |
| } | | |

In Table 9, the type of a broadcast message scheduled through the broadcast A-MAP IE is expressed as a type bitmap. Allocation size information indicates the size of a resource allocated for all broadcast messages scheduled in a corresponding frame.

Next, Table 10 shows another example of the structure of the broadcast A-MAP IE according to still another aspect of one embodiment of the present invention

TABLE 10

| Syntax | Size (bit) | Notes |
|---|---|---|
| Broadcast A-MAP IE format ( ) { | | |
| Type Bitmap | TBD[8] [16] | Bitmap indicating the types of broadcast messages. For each bit 1: indicate that the corresponding broadcast message is transmitted at this subframe (or TTI) |
| For (the number of broadcast messages) { | | The number of broadcast messages equals the number of "1"s in Type Bitmap |
| Allocation Size | 8 | This indicates the total number of LRUs allocated for broadcast management message. |
| } | | |

TABLE 10-continued

| Syntax | Size (bit) | Notes |
|---|---|---|
| Padding | Variable | |
| CRC | 16 | |
| } | | |

The structure of the broadcast A-MAP IE of Table 10 is similar to that of Table 9 except that an allocation resource field indicates a resource allocated to each broadcast message rather than to a resource allocated to all broadcast messages transmitted in a corresponding subframe.

The structure of the broadcast A-MAP IE according to one embodiment of the present invention which has been described above can reduce an error rate generated in a decoding process of the broadcast A-MAP IE and reduce CRC overhead compared with the case of using one broadcast A-MAP IE per broadcast message (when CRC is attached to each of the broadcast A-MAP IEs).

Second Embodiment

If a NUS A-MAP extension flag of a NUSCI A-MAP region, i.e. a NUS A-MAP is set, an extended NUS A-MAP may be positioned after the NUS A-MAP.

The following Table 11 shows an example of the format of the extension flag.

TABLE 11

| Syntax | Size [bits] | Notes |
|---|---|---|
| Non-user specific A-MAP extension flag | 1 | If non-user specific A-MAP extension flag is set, it indicates that non-user specific A-MAP is extended. The extended non-user specific part uses the same PHY structure as the non-user specific A-MAP. |

Another embodiment of the present invention proposes that the extended NUS A-MAP be used to transmit scheduling information of a broadcast message.

Figure 5:
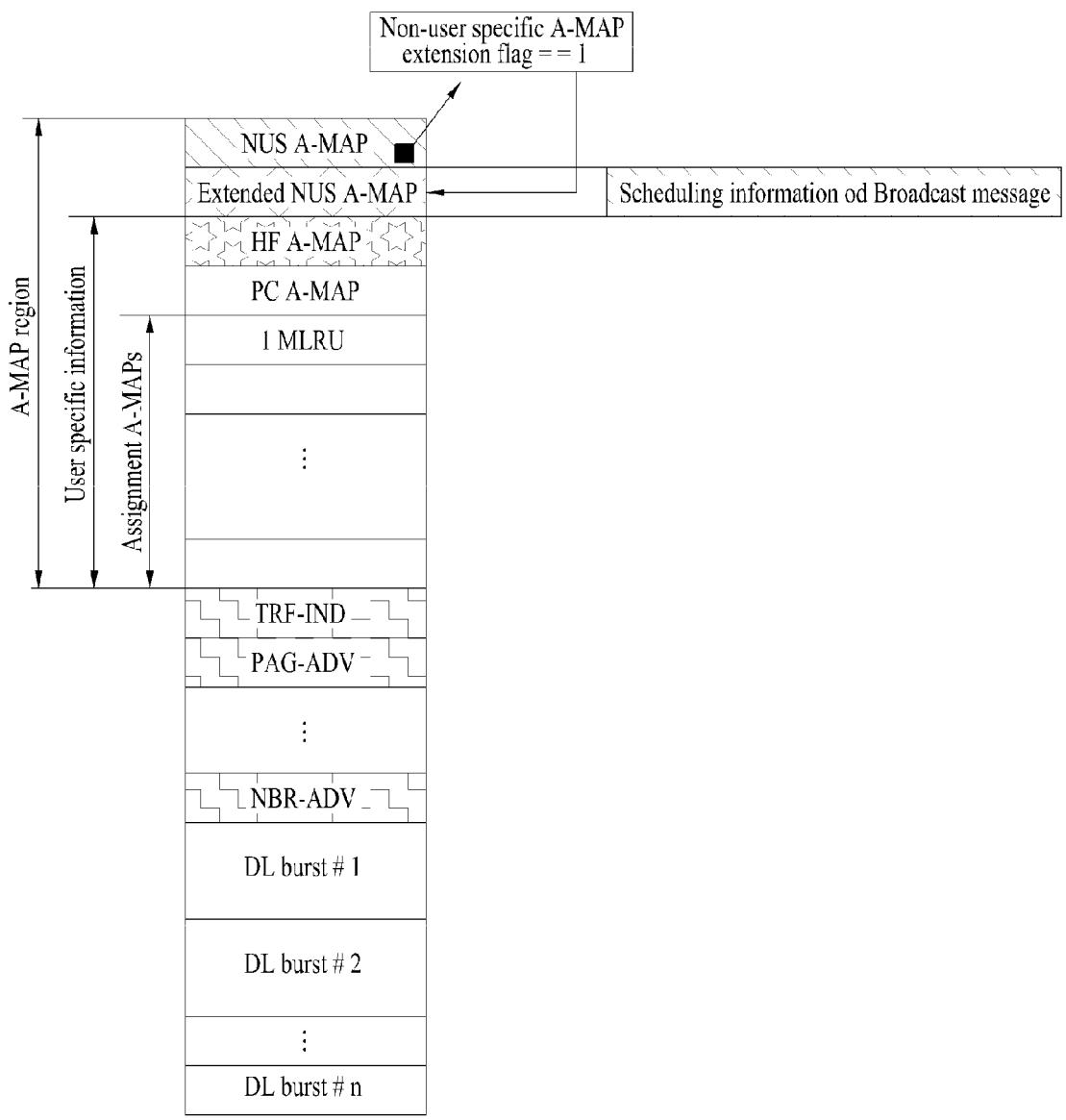
FIG. 5 shows an example of the structure of an A-MAP of a DL subframe and the arrangement of broadcast messages corresponding to the A-MAP structure when an extended NUS A-MAP is used to transmit scheduling information of the broadcast messages, according to another embodiment of the present invention.

FIG. 5 shows an example of the structure of an A-MAP of a DL subframe and the arrangement of broadcast messages corresponding to the A-MAP structure when an extended NUS A-MAP is used to transmit scheduling information of the broadcast messages according to another embodiment of the present invention.

Referring to FIG. 5, since a NUS A-MAP extension flag is set in a NUS A-MAP, an extended NUS A-MAP is positioned immediately after the NUS A-MAP.

The extended NUS A-MAP includes scheduling information (e.g. type information, allocation size information, Modulation and Coding Scheme (MCS) information, etc.) of broadcast messages transmitted in a corresponding subframe. The broadcast messages scheduled in the extended NUS A-MAP may be transmitted through one DL burst which is positioned immediately after an A-MAP region.

More specifically, information indicating the type of a broadcast message in the scheduling information of the broadcast message may have a bitmap format. Each bit of the bitmap may correspond to each of groups classifying broadcast messages according to a predetermined criterion.

If a 3-bit bitmap is used, the broadcast messages may be divided into three groups according to an MS mode.

For example, the MS mode may be divided into an idle mode, a sleep mode, and a connected mode, and each bit of a bitmap may be sequentially allocated thereto. This is described with reference to Table. 12.

Table 12 shows an example of the structure of an extended NUS A-MAP according to another embodiment of the present invention.

TABLE 12

| Syntax | Size (bit) | Notes |
|---|---|---|
| Extended Non-user specific A-MAP ( ) { | | |
| Mode Type Bitmap | 3 | Indicates for which mode broadcast messages are transmitted in a current subframe. 1st bit: transmission of a broadcast message (AAI-PAG-ADV or PGID Info) for idle mode. 2nd bit: transmission of a broadcast message (AAI-TRF-IND or unsolicited AAI-SLP-RSP) for sleep mode. 3rd bit: transmission of a broadcast message (SCDs, NBR-ADV, or SII-ADV) for the other mode (connected mode). |
| MCS | 2 | |
| Allocation Size | 7 | Indicates the size of DL bursts through which broadcast messages transmitted in a current subframe are transmitted. The DL bursts through which broadcast messages are transmitted are positioned immediately after an A-MAP region. The number of DLRUs. |
| Reserved } | TBD | reserved |

Referring to Table 12, a mode type bitmap is included in the extended NUS A-MAP and may indicate the type of a broadcast message transmitted in a current subframe in bitmap form. More specifically, if the first bit of the bitmap is set, this may indicate that a paging advertisement (PAG-ADV) message or a paging ID (PGID) information message, which is a broadcast message corresponding to an idle mode, is scheduled in a corresponding subframe.

If the second bit of the bitmap is set, this may indicate that a traffic indication (TRF-IND) message or an unsolicited sleep response (SLP-RSP) message, which is a broadcast message corresponding to a sleep mode, is scheduled in a corresponding subframe.

The third bit of the bitmap may indicate that a system information (SCD (DCD/UCD)) message, a neighbor advertisement (NBR-ADV) message, or a service identity information advertisement (SII-ADV) message, which is dedicated for an MS of a connected mode, is scheduled in a corresponding subframe.

If such a mode type bitmap is used, decoding overhead of an MS can be reduced. This is because the MS may receive a broadcast message only when a bit for a broadcast message group corresponding to an MS mode is set.

Here, the mode type bitmap may consist of 2 bits. This is described with reference to Table 13.

Table 13 shows another example of the structure of an extended NUS A-MAP according to another embodiment of the present invention.

TABLE 13

| Syntax | Size (bit) | Notes |
|---|---|---|
| Extended Non-user specific A-MAP ( ) { | | |
| Mode Type Bitmap | 2 | Indicates for which mode broadcast messages are transmitted in a current subframe. 1st bit: transmission of a broadcast message (AAI-PAG-ADV, PGID Info, AAI-TRF-IND, or unsolicited AAI-SLP-RSP) for idle mode and sleep mode. 2nd bit: transmission of a broadcast message (SCDs, NBR-ADV, or SII-ADV) for the other mode (connected mode). |
| MCS | 2 | |
| Allocation Size | 7 | Indicates the size of DL bursts through which broadcast messages transmitted in a current subframe are transmitted. The DL bursts through which broadcast messages are transmitted are positioned immediately after an A-MAP region. The number of DLRUs. |
| Reserved } | TBD | reserved |

The structure of the extended NUS A-MAP of Table 13 is similar to that of Table 12 except that the mode type bitmap consists of 2 bits unlike Table 12.

If the mode type bitmap consists of 2 bits, broadcast messages are divided into two groups: modes for power saving (an idle mode and a sleep mode) and a connected mode (and other modes).

More specifically, if the first bit of the bitmap is set, this may indicate that a paging advertisement (PAG-ADV) message, a paging ID (PGID) information message, a traffic indication (TRF-IND) message, and/or an unsolicited sleep response (SLP-RSP) message, which is a broadcast message corresponding to the idle mode or sleep mode, is scheduled in a corresponding subframe.

If the second bit of the bitmap is set, this may indicate that a system information (SCD (DCD/UCD)) message, a neighbor advertisement (NBR-ADV) message, or a service ID advertisement (SII-ADV) message, which is dedicated for an MS of a connected mode, is scheduled in a corresponding subframe.

The mode type bitmap may be replaced by an indicator bit of one bit. This is described with reference to Table 14.

Table 14 shows still another example of the structure of an extended NUS A-MAP according to another embodiment of the present invention.

TABLE 14

| Syntax | Size (bit) | Notes |
|---|---|---|
| Extended Non-user specific A-MAP ( ) { | | |
| Mode Type Bitmap | 1 | Indicates for which mode broadcast messages are transmitted in a current subframe. 0b0: one or more broadcast messages among messages for idle mode and sleep mode are transmitted in a corresponding subframe. 0b1: one or more broadcast messages except for messages for idle or sleep mode are transmitted in a corresponding subframe irrespective of whether messages for the idle or |

TABLE 14-continued

| Syntax | Size (bit) | Notes |
|---|---|---|
| | | sleep mode have been transmitted. 2nd bit: transmission of a broadcast message (SCDs, NBR-ADV, or SII-ADV) for the other mode (connected mode). |
| MCS | 2 | |
| Allocation Size | 7 | Indicates the size of DL bursts through which broadcast messages transmitted in a current subframe are transmitted. The DL bursts through which broadcast messages are transmitted are positioned immediately after an A-MAP region. The number of DLRUs. |
| Reserved | TBD | reserved |
| } | | |

Referring to Table 14, if a mode type indicator bit of one bit included in an extended NUS A-MAP is set to 0, broadcast messages related only to a power saving mode (idle mode and/or sleep mode) are transmitted. Conversely, if the mode type indicator bit is set to 1, one or more broadcast messages except for the broadcast messages related to the power saving mode are transmitted. However, even when the mode type indicator bit is set to 1, the broadcast messages related to the power saving mode may be transmitted. Namely, the mode type indicator bit is set to 0 only when the broadcast messages related to the power saving mode are transmitted and otherwise it is set to 1.

Accordingly, if the mode type indicator is set to 0, UEs in a connected mode need not perform decoding of DL bursts for broadcast messages. On the contrary, UEs operating in the idle mode or sleep mode always perform decoding of DL bursts through which broadcast messages are transmitted irrespective of a value of the mode type indicator bit, thereby selecting messages according to message types.

In the method for allocating groups to the bitmap, an order of the groups allocated to each bit or a group classification criterion are exemplary. The present invention is not limited thereto and various bit allocation orders and group classification criteria may be applied.

2-1

Meanwhile, according to another aspect of another embodiment of the present invention, a method is proposed for adding a type field to an extended NUS A-MAP so that the extended NUS A-MAP can be used as two types including a broadcast message scheduling type.

Specifically, one of the two types of the extended NUS A-MAP may be a type for transmitting scheduling information of broadcast messages, and the other one may be a type for transmitting other control information (e.g. System Configuration Descriptor (SCD) version information, an SCD change count, or information for a purpose similar to an MBS A-MAP).

A format in which a type field is included in the extended NUS A-MAP is described with reference to Table 15.

TABLE 15

| Syntax | Size (bit) | Notes |
|---|---|---|
| Extended Non-user specific A-MAP ( ) { | | |
| Type | 1 | Indicates the type of the Extended Non-user specific A-MAP. 0: includes scheduling information of broadcast messages 1: includes SCD version or configuration change count information or E-MBS A-MAP region information. |
| If (Type == 0) { | | // Scheduling information of broadcast messages |
| Mode Type Bitmap | 3 | Indicates for which mode broadcast messages are transmitted in a current subframe. 1st bit: transmission of a broadcast message (AAI-PAG-ADV or PGID Info) for idle mode. 2nd bit: transmission of a broadcast message (AAI-TRF-IND or unsolicited AAI-SLP-RSP) for sleep mode. 3rd bit: transmission of a broadcast message (SCDs, NBR-ADV, or SII-ADV) for the other mode (connected mode). |
| MCS | 1 | |
| Allocation Size | 7 | Indicates the size of DL bursts through which broadcast messages transmitted in a current subframe are transmitted. The DL bursts through which broadcast messages are transmitted are positioned immediately after an A-MAP region. The number of DLRUs. |
| } else { | | |
| Change count | TBD | Change count of an SCD. A detailed structure is FFS. |
| } | | |
| Reserved | TBD | reserved |
| } | | |

Referring to Table 15, the Type field is included in the extended NUS A-MAP to indicate whether the extended NUS A-MAP includes scheduling information for broadcast messages or other control information.

Although the mode type bitmap is represented by 3 bits as in Table 12, it may be replaced with a 2-bit type or a type indicator bit of Table 13 or Table 14.

2-2

Meanwhile, according to still another aspect of another embodiment of the present invention, a method is provided for adding the type field to the extended NUS A-MAP so that the extended NUS A-MAP can be used as two types including the broadcast message scheduling type and further adding an extension flag field so that two or more extended NUS A-MAPs can be used.

Namely, the extension flag field is included in the extended NUS A-MAP. If the extension flag field is set to 1, this may indicate that another extended NUS A-MAP is positioned after a corresponding extended NUS A-MAP.

A detailed format in which the extension flag field is included in the extended NUS A-MAP is described with reference to the following Table 16 to Table 18.

Table 16 shows an example of a format in which the extension flag field is included in the extended NUS A-MAP according to still another aspect of another embodiment of the present invention.

TABLE 16

| Syntax | Size (bit) | Notes |
| --- | --- | --- |
| Extended Non-user specific A-MAP ( ) { | | |
| Type | 1 | Indicates the type of the Extended Non-user specific A-MAP. 0: includes scheduling information for broadcast messages. 1: SCD configuration change count information. |
| If (Type == 0) { | | // Scheduling information of broadcast messages |
| Mode Type Bitmap | 3 | Indicates for which mode broadcast messages are transmitted in a current subframe. 1st bit: transmission of a broadcast message (AAI-PAG-ADV or PGID Info) for idle mode. 2nd bit: transmission of a broadcast message (AAI-TRF-IND or unsolicited AAI-SLP-RSP) for sleep mode. 3rd bit: transmission of a broadcast message (SCDs, NBR-ADV, or SII-ADV) for the other mode (connected mode). |
| Allocation Size | 7 | Indicates the size of DL bursts through which broadcast messages transmitted in a current subframe are transmitted. The DL bursts through which broadcast messages are transmitted are positioned immediately after an A-MAP region. The number of DLRUs. |
| } else { Change count } | TBD | Change count of an SCD. |
| Extension flag | 1 | Indicates whether another Extended Non-user specific A-MAP follows this A-MAP. 1: The A-MAP is followed by another Extended Non-user specific A-MAP. |
| } | | |

Referring to Table 16, the Type field is used to identify the type of the extended NUS A-MAP. If the Type field is set to 0, this may indicate that scheduling information for broadcast messages is included in the extended NUS A-MAP. If the Type field is set to 1, this may indicate that SCD configuration change count information is included in the extended NUS A-MAP.

If the Extension flag is set to 1, this may indicate whether another extended NUS A-MAP follows the extended NUS A-MAP.

Table 17 shows another example of a format in which the extension flag field is included in the extended NUS A-MAP according to still another aspect of another embodiment of the present invention.

TABLE 17

| Syntax | Size (bit) | Notes |
| --- | --- | --- |
| Extended Non-user specific A-MAP ( ) { | | |
| Type | 1 | Indicates the type of the Extended Non-user specific A-MAP. 0: includes scheduling information for broadcast messages. 1: SCD configuration change count information. |
| If (Type == 0) { | | // Scheduling information of broadcast messages |
| Mode Type Bitmap | 2 | Indicates for which mode broadcast messages are transmitted in a current subframe. 1st bit: transmission of a broadcast message (AAI-PAG-ADV, PGID Info, or AAI-TRF-IND) for idle mode and sleep mode. 2nd bit: transmission of a broadcast message (SCDs, NBR-ADV, or SII-ADV) for the other mode (connected mode). |
| MCS | 1 | |
| Allocation Size | 7 | Indicates the size of DL bursts through which broadcast messages transmitted in a current subframe are transmitted. The DL bursts through which broadcast messages are transmitted are positioned immediately after an A-MAP region. The number of DLRUs. |
| } else { Change count } | TBD | Change count of an SCD. |
| Extension flag | 1 | Indicates whether another Extended Non-user specific A-MAP follows this A-MAP. 1: The A-MAP is followed by another Extended Non-user specific A-MAP. |
| } | | |

The structure of the extended NUS A-MAP of Table 17 is similar to that of Table 16 except that an MCS field indicating the MCS of broadcast messages scheduled through the extended NUS A-MAP is added and the mode type bitmap is changed to a 2-bit type from a 3-bit type.

Table 18 shows still another example of a format in which the extension flag field is included in the extended NUS A-MAP according to still another aspect of another embodiment of the present invention.

TABLE 18

| Syntax | Size (bit) | Notes |
| --- | --- | --- |
| Extended Non-user specific A-MAP ( ) { | | |
| Type | 1 | Indicates the type of the Extended Non-user specific A-MAP. 0: includes scheduling information for broadcast messages. 1: E-MBS region or E-MAP A-MAP region information. |
| If (Type == 0) { | | // Scheduling information of broadcast messages |
| Mode Type Bitmap | 3 | Indicates for which mode broadcast messages are transmitted in a current subframe. 1st bit: transmission of a broadcast message (AAI-PAG-ADV or PGID Info) for idle mode. 2nd bit: transmission of a broadcast message (AAI-TRF-IND or unsolicited AAI-SLP-RSP) for sleep mode. 3rd bit: transmission of a broadcast message (SCDs, NBR-ADV, or SII-ADV) for the other mode (connected mode). |
| MCS | 1 | |
| Allocation Size | 7 | Indicates the size of DL bursts through which broadcast messages transmitted in a current subframe are transmitted. The DL bursts through which broadcast messages are transmitted are positioned |

TABLE 18-continued

| Syntax | Size (bit) | Notes |
|---|---|---|
| } else { | | immediately after an A-MAP region. The number of DLRUs. |
| E-MBS region or E-MBS A-MAP position | TBD | E-MAP A-MAP region information. |
| } Extension flag | 1 | Indicates whether another Extended Non-user specific A-MAP follows this A-MAP. 1: The A-MAP is followed by another Extended Non-user specific A-MAP. |
| } | | |

The structure of the extended NUS A-MAP of Table 18 is similar to that of Table 16. However, if the Type field is set to 1, this may indicate that information representing an E-MBS region or E-MBS A-MAP region instead of the SCD configuration change count information is included in the extended NUS A-MAP.

A subframe structure, to which the A-MAP structure is applied according to another embodiment of the present invention and which has been described with reference Table 16 to Table 18, will now be described in conjunction with FIG. 6.

Figure 6:
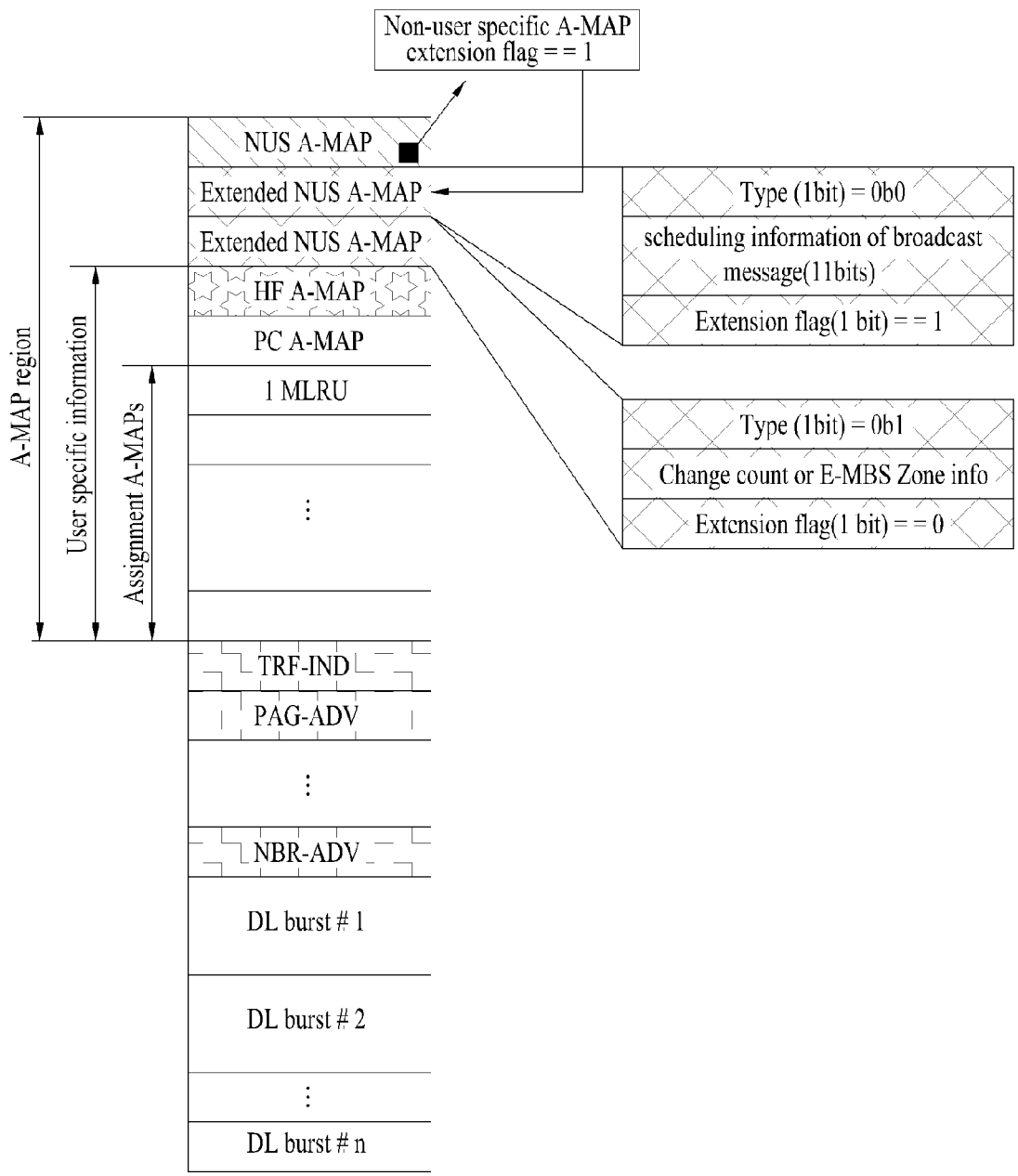
FIG. 6 shows an example of a resource allocation structure of a DL subframe when an extension flag is applied according to still another aspect of another embodiment of the present invention.

FIG. 6 shows an example of a resource allocation structure of a DL subframe when an extension flag is applied according to still another aspect of another embodiment of the present invention.

Referring to FIG. 6, since a NUS A-MAP extension flag in NUSCI is set, the NUSCI is followed by an extended NUS A-MAP. In addition, since the extension flag of the extended NUS A-MAP is set, another extended NUS A-MAP follows the extended NUS A-MAP. However, since the last extension flag of the extended NUS A-MAP is not set, no extended NUS A-MAP is present. In this case, a type field of the first extended NUS A-MAP is set to 0 indicating that scheduling information of broadcast messages is included. A type field of the second extended NUS A-MAP is set to 1 indicating that SCD change count or E-MBS related information is included.
2-3

Meanwhile, in the above-described embodiments, if there is no field indicating MCS information to be applied to broadcast messages in an A-MAP including scheduling information of the broadcast messages, it is desirable to provide a method in which an MS can determine an MCS of the broadcast messages scheduled through a corresponding A-MAP. To this end, the present embodiment proposes that the MS determine an MCS of a broadcast messages based on a coding rate of a Secondary Super Frame Header (S-SFH).

The MS may obtain the coding rate of the S-SFH through a Primary SFH (P-SFH). In this case, the MS may determine the MCS applied to the broadcast message using a preset table.

This preset table is shown in the following Table 19 and Table 20.

TABLE 19

| Coding rate of S-SFH | | I_sizeoffset of broadcast message |
|---|---|---|
| 0 | 1/12 | 0 |
| 1 | 1/8 | 3 |
| 2 | 1/6 | 6 |
| 3 | 1/4 | 9 |

Referring to Table 19, I_sizeoffset applied to a broadcast message can be determined according to the coding rate of an S-SFH. The MS can determine an MCS of a broadcast message using the I_sizeoffset value and allocation size information indicated in an A-MAP including scheduling information of the broadcast message.

TABLE 20

| S-SFH Transmission Format | Transmission Format for S-SFH (Repetition) | I_sizeoffset of broadcast message (Reuse 1) | I_sizeoffset of broadcast message (Power boosted region in Reuse 3) | Number of repetitions for broadcast message |
|---|---|---|---|---|
| 0 | 12 | 0 | TBD | 2 |
| 1 | 8 | 3 | TBD | 2 |
| 2 | 6 | 6 | TBD | 2 |
| 3 | 4 | 9 | TBD | 2 |

In Table 20, information corresponding to the coding rate of the S-SFH is provided as a repetition form and a reuse factor is further considered.

The table such as Table 19 or Table 20 is predetermined by a network or communication provider and it is desirable that an MS and a BS previously share the table.

Structure of MS and BS

Hereinafter, a description will be given of an MS and a BS (Femto BS (FBS) and Macro BS (MBS)) for implementing the above-described embodiments of the present invention, according to another embodiment of the present invention.

The MS may operate as a transmitter in UL and as a receiver in DL, while the BS may operate as a receiver in UL and as a transmitter in DL. That is, each of the MS and the BS may include a transmitter and a receiver for transmission of information or data.

The transmitter and the receiver may include processors, modules, parts, and/or means for implementing the embodiments of the present invention. Especially, the transmitter and the receiver may include modules (means) for encrypting messages, modules for interpreting the encrypted messages, antennas for transmitting and receiving the messages, and the like. An example of the transmitter and the receiver will now be described with reference to FIG. 7.

Figure 7:
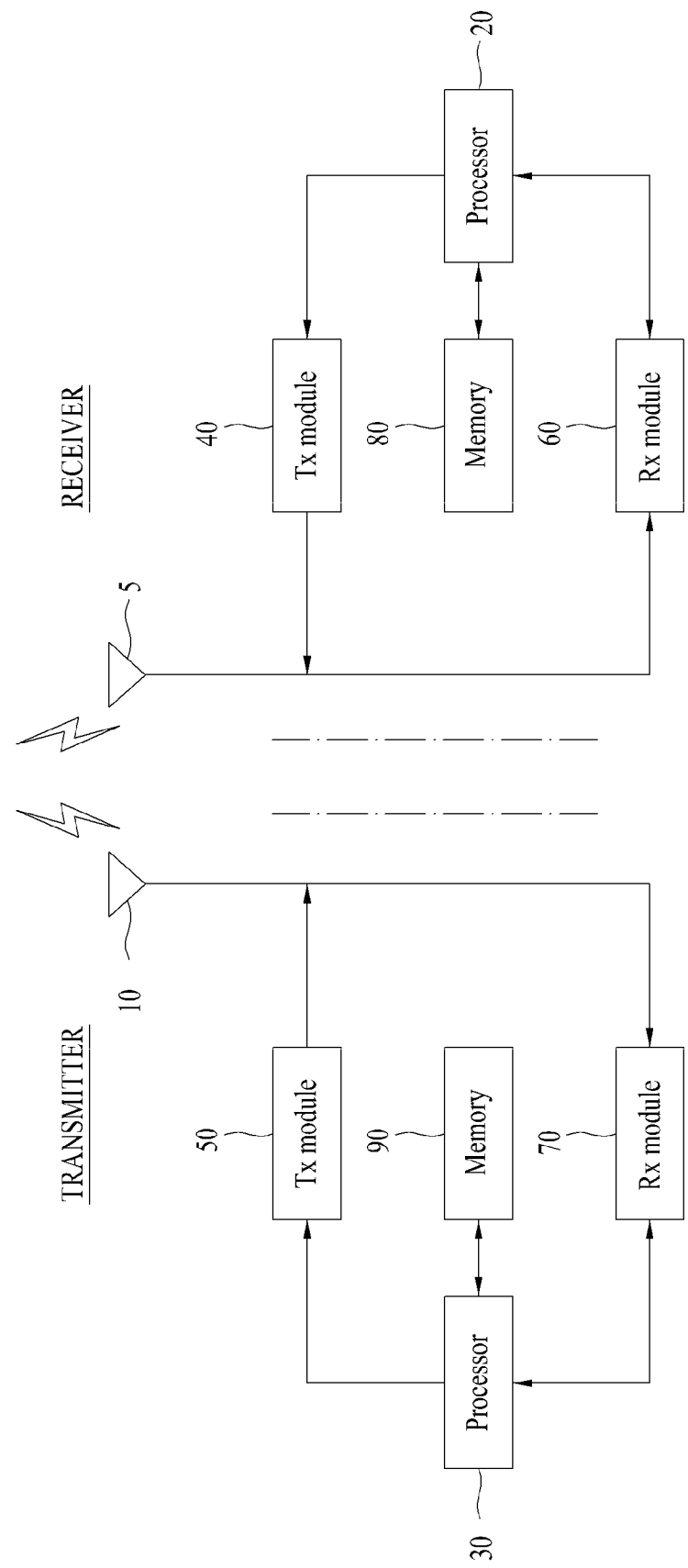
FIG. 7 is a block diagram showing an example of the structure of a transmitter and a receiver according to a further embodiment of the present invention.

FIG. 7 is a block diagram showing the structures of a transmitter and a receiver according to a further embodiment of the present invention.

Referring to FIG. 7, the left part illustrates the structure of the transmitter and the right part illustrates the structure of the receiver. Each of the transmitter and the receiver may include an antenna 5 or 10, a processor 20 or 30, a Transmission (Tx) module 40 or 50, a Reception (Rx) module 60 or 70, and a memory 80 or 90. The constituent elements of the transmitter may perform functions of the counter parts of the receiver. The constituent elements of the transmitter and the receiver will be described below in more detail.

The antennas 5 and 10 transmit signals generated from the Tx modules 40 and 50 to the exterior, or receive radio signals from the exterior and provide the received radio signals to the Rx modules 60 and 70. If a Multiple Input Multiple Output (MIMO) function is supported, two or more antennas may be provided.

The antenna, the Tx module, and the Rx module may constitute a Radio Frequency (RF) module.

The processors 20 and 30 generally control overall operation of the MS. For example, the processors 20 and 30 may perform a control function for implementing the above-described embodiments of the present invention, a variable MAC frame control function based on service characteristics and propagation environment, a handover function, an authentication and encryption function, etc.

Specifically, the processor of the MS may receive a broadcast A-MAP transmitted through a part of an A-MAP region of a DL subframe to obtain scheduling information of a broadcast message transmitted in a corresponding subframe and may receive a corresponding broadcast message through a DL resource region indicated by the scheduling information. In this case, if MCS information applied to the broadcast message is not included in the broadcast A-MAP, the processor of the MS may determine an MCS applied to the broadcast message using a coding rate applied to an S-SFH.

Additionally, the processor of the MS may perform overall control of the operation processes described in the above-mentioned embodiments.

The Tx modules 40 and 50 may encode and modulate transmission data scheduled by the processors 20 and 30 and provide the encoded and modulated data to the antenna 10.

The Rx modules 60 and 70 may restore original data by demodulating and decoding radio signals received through the antennas 5 and 10 from the exterior and provide the restored data to the processors 20 and 30.

The memories 80 and 90 may store programs for processing and controlling the processors 20 and 30 and temporarily store input/output data. Each of the memories 80 and 90 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc.

Meanwhile, the BS may perform a control function for implementing the above-described embodiments of the present invention, Orthogonal Frequency Division Multiple Access (OFDMA) packet scheduling, Time Division Duplex (TDD) packet scheduling and channel multiplexing functions, a variable MAC frame control function based on service characteristics and propagation environments, a real-time high-speed traffic control function, a handover function, an authentication and encryption function, a packet modulation/demodulation function for data transmission, a high-speed packet channel coding function, a real-time modem control function, etc., by at least one of the above-described modules, or the BS may further include an additional means, module, or part for performing these functions.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. Further, claims which are not explicitly dependent on each other can be combined to provide an embodiment or new claims can be added through amendment after this application is filed.

INDUSTRIAL APPLICABILITY

Although the more efficient broadcast message transmission procedure in a broadband wireless access system and the MS structure therefor have described focusing on an IEEE 802.16 system, they are applicable to a variety of mobile communication systems other than IEEE 802.xx systems.

The invention claimed is:

1. A method for transmitting a broadcast message in a broadband wireless access system, comprising:
   transmitting a first MAP including scheduling information for at least one broadcast message to be transmitted within a prescribed transmission unit to a mobile station; and
   broadcasting the at least one broadcast message through a resource region indicated by the scheduling information,
   wherein the first MAP is an extended MAP of a second MAP including non-user specific control information,
   wherein the scheduling information includes type information indicating a type of the at least one transmitted broadcast message and allocation size information indicating the resource region,
   wherein the type information is in the form of a bitmap which consists of three bits, each bit indicating one of three groups in which broadcast messages are classified according to mobile station mode, and the bitmap indicates which group of broadcast messages is to be transmitted,
   wherein the mobile station mode comprises an idle mode, a sleep mode and a connected mode, and
   wherein the first MAP is transmitted immediately after the second MAP when an extension flag in the second MAP is set.

2. The method of claim 1, wherein the first MAP is an extended non-user specific A-MAP, the second MAP is a non-user specific A-MAP, and the prescribed transmission unit is a subframe.

3. A method for receiving a broadcast message from a base station at a mobile station in a broadband wireless access system, comprising:
   receiving a first MAP including scheduling information for at least one broadcast message to be transmitted from the base station within a prescribed transmission unit; and
   receiving the at least one broadcast message from the base station through a resource region indicated by the scheduling information,
   wherein the first MAP is an extended MAP of a second MAP including non-user specific control information,
   wherein the scheduling information includes type information indicating a type of the at least one transmitted broadcast message and allocation size information indicating the resource region,
   wherein the type information is in the form of a bitmap which consists of three bits, each bit indicating one of three groups in which broadcast messages are classified according to mobile station mode, and the bit map indicates which group of broadcast messages is to be transmitted,
   wherein the mobile station mode comprises an idle mode, a sleep mode and a connected mode, and
   wherein the first MAP is transmitted immediately after the second MAP when an extension flag in the second MAP is set.

4. The method of claim 3, wherein the first MAP is an extended non-user specific A-MAP, the second MAP is a non-user specific A-MAP, and the prescribed transmission unit is a subframe.

5. A mobile station for receiving a broadcast message from a base station in a broadband wireless access system, comprising:

a processor; and an antenna for transmitting and receiving a radio signal to and from the base station along with a transmission module and a reception module according to control of the processor, wherein the processor performs a control function to receive a first MAP including scheduling information for at least one broadcast message to be transmitted from the base station within a prescribed transmission unit, and to receive the at least one broadcast message from the base station through a resource region indicated by the scheduling information, and wherein the first MAP is an extended MAP of a second MAP including non-user specific control information, wherein the scheduling information includes type information indicating a type of the at least one transmitted broadcast message and allocation size information indicating the resource region, wherein the type information is in the form of a bitmap which consists of three bits, each bit indicating one of three groups in which broadcast messages are classified according to mobile station mode, and the bitmap indicates which group of broadcast messages is to be transmitted, wherein the mobile station mode comprises an idle mode, a sleep mode and a connected mode, and wherein the first MAP is transmitted immediately after the second MAP when an extension flag in the second MAP is set.

6. The mobile station of claim 5, wherein the first MAP is an extended non-user specific A-MAP, the second MAP is a non-user specific A-MAP, and the prescribed transmission unit is a subframe.

* * * * *